Feb. 14, 1967  R. C. BUELER  3,304,131
PROTECTOR VALVE FOR A TRAILER BRAKE SYSTEM
Filed Aug. 27 1964  2 Sheets-Sheet 2

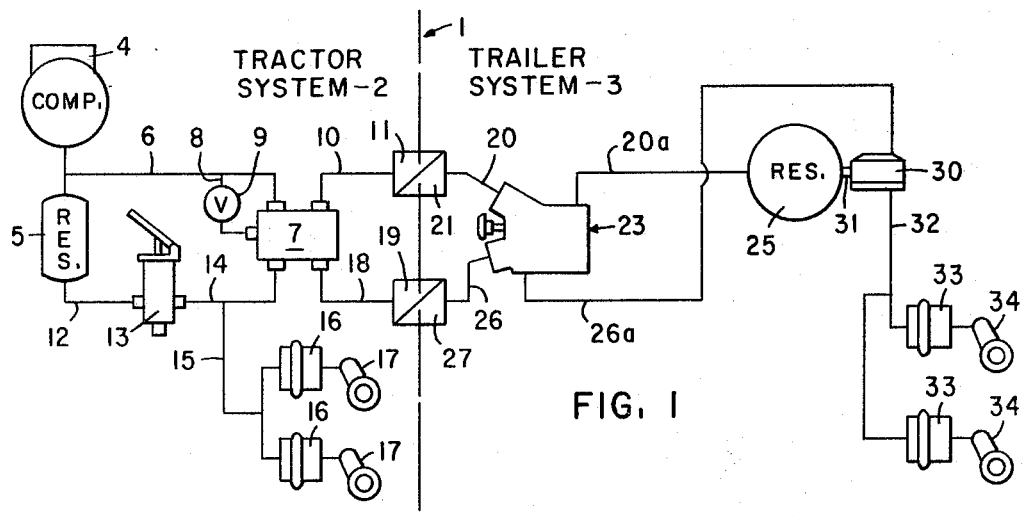
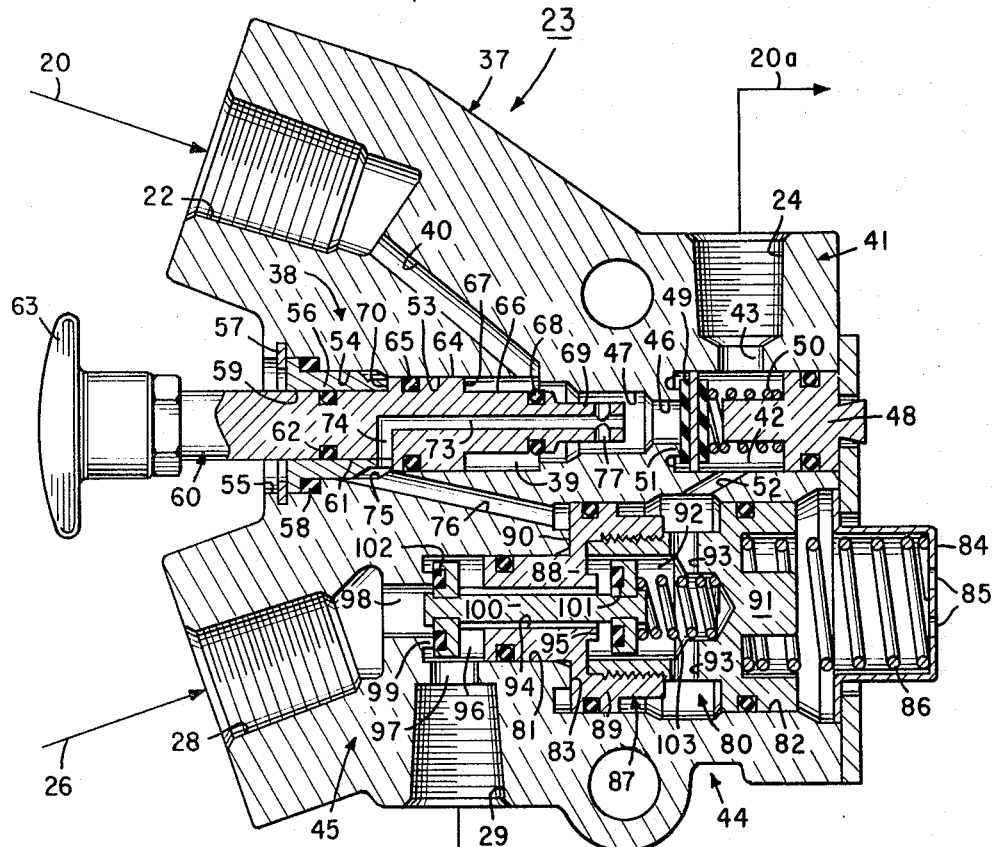

INVENTOR
RICHARD C. BUELER
BY Gravely, Lieder &
Woodruff
ATTORNEYS

United States Patent Office 3,304,131
Patented Feb. 14, 1967

3,304,131
PROTECTOR VALVE FOR A TRAILER BRAKE SYSTEM
Richard C. Bueler, Glendale, Mo., assignor to Wagner Electric Corporation, St. Louis, Mo., a corporation of Delaware
Filed Aug. 27, 1964, Ser. No. 392,459
5 Claims. (Cl. 303—29)

This invention relates generally to the air brake art, and more particularly to protector valves employed in trailer brake systems.

The principal object of the present invention is to provide improved valve means for assuring positive and effective trailer brake actuation and release under service, emergency and manually selective conditions.

Another object is to provide a valve for a trailer air system, and which is automatically operable under emergency conditions to set the trailer brakes, is selectively operable to release or set the trailer brakes, and is automatically operable under normal operating conditions to disable the selectively operable means and release the trailer brakes.

Another object is to provide a valve that will control the trailer air system under all operating and emergency conditions and will preserve the integrity of the trailer air system.

These and still other objects and advantages will become more apparent hereinafter.

Briefly, the invention is embodied in a trailer protector valve disposed in the emergency and service line connections to a tractor air system, and including an emergency control portion normally connnecting a trailer reservoir to actuate the trailer brakes, a tractor connection portion adapted to disable the emergency control portion to release the trailer brakes for normal service actuation and release thereof, and a release control portion interposed in the tractor connection portion and operatively connected with the emergency control portion for selectively enabling and disabling the emergency control portion.

The invention is also embodied in the parts and combinations of parts hereinafter described and claimed.

Figure 3:
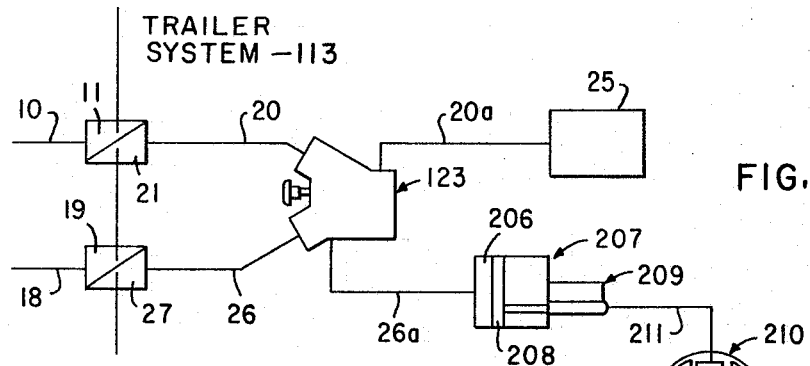
Figure 4:
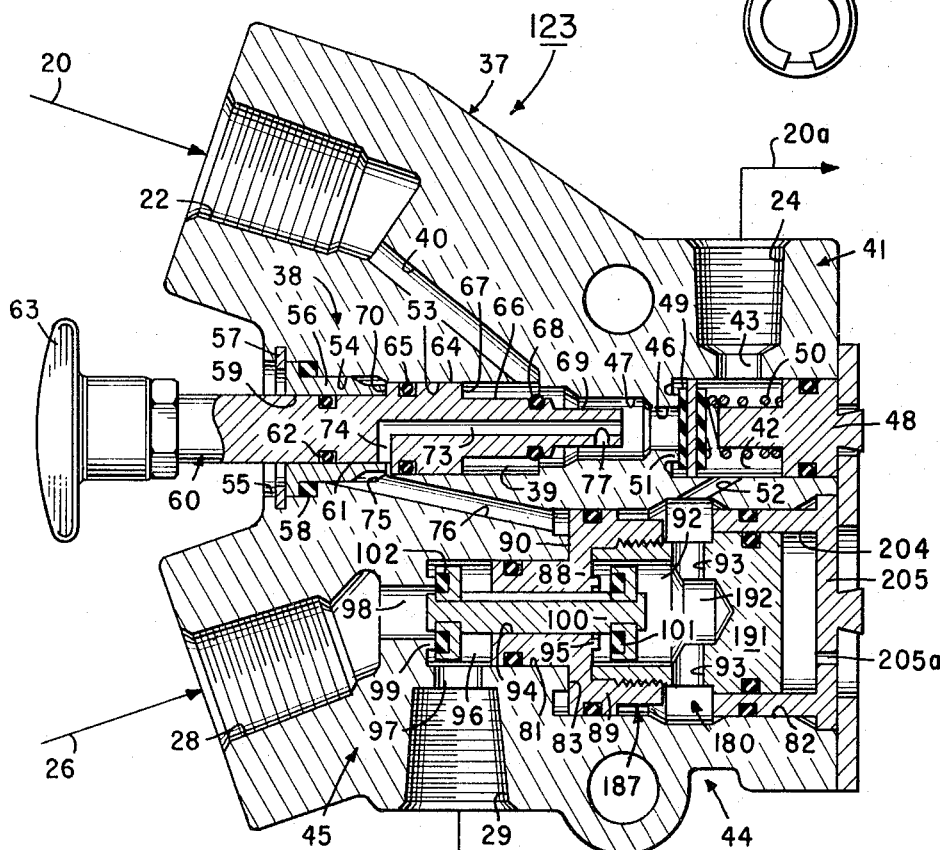

In the accompanying drawings which form a part of the specification and wherein like numerals refer to like parts wherever they occur:

FIGURE 1 is a diagrammatic view of a tractor-trailer brake system having a trailer protector valve embodying the invention, FIGURE 2 is a vertical cross-sectional view of the trailer protector valve incorporated in the system of FIGURE 1, FIGURE 3 is a diagrammatic view illustrating a modified trailer system employing the invention, and FIGURE 4 is a vertical cross-sectional view similar to FIGURE 2, but showing a modification of the trailer protector valve.

Referring now to FIGURE 1 of the drawings, it will be seen that a typical tractor-trailer air braking system 1 is diagrammatically illustrated and includes a tractor system 2 and a trailer system 3. The tractor system 2 is provided with pressure producing means or air compressor 4 connected to a main air tank or reservoir 5 and also being connected by an emergency line or conduit 6 to the emergency inlet port of a tractor protector valve 7. The control inlet port to the tractor protector valve 7 is also connected to the line 6 or main reservoir 5 by a control line or conduit 8 having a manual valve 9 interposed therein. A tractor emergency line or conduit 10 connects the emergency outlet port of the tractor protector valve 7 with a gladhand coupler 11. A conduit 12 connects the main reservoir 5 with the inlet of an application valve 13, the outlet of the application valve being connected by a service line 14 to the service inlet port of the tractor protector valve 7. A conduit 15 connects the service line 14 to tractor air chamabers 16 operatively linked with slack adjusters 17 to actuate tractor wheel brake assemblies (not shown). A tractor service line 18 connects the tractor outlet port of the tractor protector valve 7 to a gladhand coupler 19.

The tractor protector valve 7 may be of conventional construction to maintain the inlet and outlet service and emergency line connections thereto in fluid communication during normal operation, and to close off communication due to breakage or other failure in the lines in order to maintain the integrity of the tractor system portion 2. A more complete understanding of the construction and operation of the tractor protector valve 7 may be had by reference to Fites Patent No. 2,859,763 issued November 11, 1958.

The trailer air system 3 includes a trailer emergency line or conduit 20 having a gladhand coupler 21 detachably connected to the coupler 11 of the tractor system 2, and the other end of the emergency line 20 being connected to the emergency inlet port 22 of a trailer protector valve 23 embodying the invention. An emergency outlet port 24 of the trailer protector valve 23 is connected by emergency line 20a to a trailer reservoir 25. A trailer service line or conduit 26 has a gladhand coupler 27 detachably connected to the coupler 19 in the tractor system 2, and the other end of the conduit 26 is connected with the service inlet port 28 of the trailer protector valve 23. The service outlet port 29 of the trailer protector valve 23 is connected by a trailer service line 26a to the service port or control inlet of a trailer relay valve 30 of well-known construction. It will thus be seen that the trailer protector valve 23 is interposed in both the trailer emergency line 20, 20a and the trailer service line 26, 26a. The relay valve 30 is connected by line 31 to the trailer reservoir 25 and by line 32 to trailer air chambers 33 which are operatively linked with slack adjusters 34 to actuate trailer wheel brake assemblies (not shown).

The relay valve 30 may be of conventional construction to normally maintain the trailer brakes in fluid communication with atmosphere and to isolate the trailer reservoir 25 from the trailer brakes and exhaust connection. The relay valve 30 is operative in response to fluid pressure in the control inlet to interrupt the connection of the trailer brakes to atmosphere and to connect the trailer reservoir 25 to effect brake actuation.

Referring now to FIGURE 2, the trailer protector valve 23 comprises a main casing 37 in which the emergency inlet port 22, the emergency outlet port 24, the service inlet port 28 and the service outlet port 29 are formed. The trailer protector valve 23 includes a trailer release control portion 38 having a tractor connection or control chamber 39 in communication with the emergency inlet port 22 through a passage 40, an inlet chamber portion 41 having an inlet chamber 42 in communication with the emergency outlet port 24 through passage 43, an emergency control portion 44 and a brake actuating connection portion 45.

The inlet chamber 42 is connected at one end through a stepped passage including bore 46 and counterbore 47 to the control chamber 39, and the other end of the inlet chamber 42 is closed by an insert plug 48. A check valve 49 is biased by a spring 50 to a normally closed position against a valve seat 51 circumscribing the bore 46. It will be noted that the control chamber 39 is in open fluid communication with the emergency conduit 20 through the inlet port 22, and that the inlet chamber 42 is in open fluid communication with the trailer reservoir 25 through the emergency line 20a and the emergency outlet port 24.

The inlet chamber 42 is also connected to the emergency control portion 44 intermediate its ends by a passage 52.

The trailer release control portion 38 includes a main bore 53 formed in the casing 37 extending coaxially from the passage counterbore 47 and defining the control chamber 39 at the rightward end thereof as shown in FIGURE 2. The casing 37 at the leftward end of the bore 53 is counterbored to form stepped concentric surfaces 54 and 55 in which a flanged bushing 56 is positioned by a snap ring 57 and sealed with the casing by a sealing member 58. The bushing 56 has a cylindrical guide surface or bore 59 of smaller diameter than the main bore 53 of the trailer release control portion 38. A reciprocable plunger 60 has a guide portion 61 slidably positioned in the cylindrical bore 59 of the bushing 56, an O-ring 62 being carried by the guide portion 61 for sealable engagement with the sidewall of the bushing bore 59. The plunger 60 extends exteriorly of the casing 37 from the guide portion 61 and is provided with an operating knob 63 on the free end thereof. The plunger 60 also has a control portion extending coaxially from the guide portion 61 through the main bore 53 and into the passage counterbore 47. The control portion includes an enlarged piston member 64 slidably positioned in the main bore 53 and carrying an O-ring 65 sealably engaged with the bore sidewall, and a small piston member 66 forming a radial shoulder 67 with the large piston member 64 and extending rightwardly therefrom. The small piston member 66 carries an O-ring 68 and is sized to be slidably and sealably engaged in the passage counterbore 47. A piston extension 69 is formed on the rightward end of the small piston member 66 and is adapted to be freely received within the passage bore 46 to displace the check valve 49 from the seat 51 to provide free fluid communication therepast.

It will be noted that a radial shoulder 70 is formed between the guide portion 61 and large piston member 64, and that the effective area $A_1$ of the radial shoulder 70 is smaller than the effective area $A_2$ of the radial shoulder 67 formed between the piston members 64 and 66. It should further be noted that a radial area $A_3$ is formed at the conjunction of the piston extension 69 with the small piston member 66. The importance of these areas $A_1$, $A_2$ and $A_3$ will be more fully set out hereinafter. The plunger 60 also includes an axial passage 73 extending from the free end of the piston extension 69 and connecting with a radial passage 74 intersecting the radial shoulder 70, an annular groove 75 being formed between the main bore 53 and surface 54 to communicate with the passages 73 and 74 and with an emergency control passage 76 formed in the casing 37. A cross passage 77 also intersects the axial passage 73 adjacent to the end of the piston extension 69. The plunger 60 is normally biased by fluid pressure in the control chamber 39 leftwardly in the main bore 53 with its radial shoulder 70 retained in abutment with the end of the flanged bushing 56 to thereby space the small piston member 66 and extension 69 away from the passage 46, 47 and permit the check valve 49 to engage its valve seat 51.

The emergency control portion 44 includes a chamber 80 formed by a bore 81 and counterbore 82 having a shoulder 83 therebetween connected by the passage 76 through the plunger passages 73, 74 with the control chamber 39 and inlet port 22. The counterbore 82 is closed at its outer end by a flanged cup 84 having an atmospheric port 85, the cup seating one end of a spring 86. A stepped emergency control piston 87 includes a small end 88 slidable in the bore 81 and a large end 89 slidable in the counterbore 82, the piston having a fluid responsive shoulder area 90 normally biased against the chamber shoulder 83 by the spring 86. The large end 89 of the piston 87 also includes a piston extension member 91 threaded thereto and forming an internal chamber 92, the extension member 91 or large piston portion having radial ports 93 to provide fluid communication between the internal chamber 92 and passage 52 to the inlet chamber 42 at all times. An axial passage 94 is also formed in the piston 87 from the small end 88 to the internal chamber 92 and a valve seat 95 is formed on the piston 87 circumscribing the passage 94 projecting into the chamber 92.

The bore 81 at the small end 88 of the control piston 87 forms a connection chamber 96 of the brake actuating connection portion 45 and which is connected by a passage 97 to the service outlet port 29 at all times, and is also adapted to be connected by a passage 98 to the service inlet port 28. A valve seat 99 is formed at the end of the bore 81 in circumscribing relation with the passage 98 and opposed relation with the small end 88 of the piston 87.

Fluid communication between the internal chamber 92 or the passage 98 into the connection chamber 96 and to the passage 97 is controlled by a dumbbell type valve assembly having a shank 100 slidable in the axial passage 94, but permitting fluid flow therethrough. An emergency inlet control valve 101 is positioned on the end of the shank in the internal chamber 92, and a service inlet control valve 102 is formed on the other end of the shank 100 in the connection chamber 96. A spring 103 in the internal chamber 92 biases the emergency and service inlet control valves 101 and 102 toward the respective valve seats 95 and 99 therefor.

It will be noted that the internal chamber 92 of the piston 87 has equal and opposite areas and that the radial shoulder 90 has an effective area $A_4$ in fluid communication with the passage 76. The piston 87 is biased leftwardly in the chamber 80 by the spring 86, which is of predetermined appreciable magnitude.

In the charging operation of the system 1 and valve 23, assuming that the reservoirs 5 and 25 are empty, FIGURE 2 shows the parts of the valve 23 in the normally inoperative condition thereof. When the air compressor 4 is placed in operation, pressure fluid will be discharged to the main reservoir 5 and will flow therefrom through the emergency conduits 6 and 8 to the control port of the tractor protector valve 7. When a predetermined air pressure is developed in the reservoir 5 and active in the control port of the tractor protector valve 7, this valve will operate in a well-known manner to open connections between its emergency inlet and outlet ports to connect the conduits 6 and 10 and between its service inlet and outlet ports to connect the conduits 14 and 18.

The pressure fluid will now pass from the compressor 4 or tractor reservoir 5 through the emergency line 6, tractor protector valve 7 and emergency lines 10 and 20 to the emergency inlet port 22 of the trailer protector valve 23 and will communicate with the effective area $A_4$ of the control piston shoulder 90 through the control chamber 39 and passages 73, 74 and 76. The pressure fluid will also open the check valve 49 and flow simultaneously from the inlet chmaber 42 into the passages 43 and 52. From the passage 43 the pressure fluid will pass through the outlet port 24 and conduit 20a directly to the trailer or auxiliary reservoir 25. From the passage 52, the pressure fluid flows into the internal chamber 92 of the control piston 87 and acts on the equal and opposite areas of the large end 89 and the extension member 91, and, from the internal chamber 92, the pressure fluid flows past the open emergency inlet control valve 101 through the axial passage 94, connection chamber 96 and service line 26a to actuate the relay valve 30 in a well-known manner and meter pressure from the reservoir 25 into the brake chambers 33 to energize the trailer brakes.

It will be apparent that the air compressor 4 will continue to operate until a predetermined fluid pressure is provided in the main reservoir 5, and a substantially equal fluid pressure will also be developed in the auxiliary reservoir 25 due to the fact that the check valve 49 is loaded by a spring 50 of negligible force. As the emergency line pressure reaches a preselected value, the force created by this pressure acting on the area $A_4$ of the control piston 87 moves the piston against the compressive force of the spring 86 whereby the emergency inlet control valve 101 is seated on the valve seat 95 to seal off the axial passage 94. It will be noted that the pressure fluid in the chamber 96 is also acting on the effective area of the small end 88 of the control piston 87, which force is additive to the force of the pressure acting on the area $A_4$. However, when the control piston 87 is moved further against the compressive force of the spring 86, the service inlet control valve 102 is moved from its seat 99 to exhaust pressure fluid from the chamber 98 and small end 88 of the piston through the exhaust port (not shown) of the application valve 13. The continued pressure built up on the area $A_4$ of the piston is greater than the loss of pressure fluid from the small end 88 whereby the control piston 87 is moved to and maintained in a rightwardly position overcoming the spring 86 and, in its fully charged or cocked position, the control valve 87 carries the service inlet valve 102 to an unrestricted position relative to its valve seat 99.

When the service inlet valve 102 is opened to exhaust the pressure fluid in the relay valve 30, the trailer brakes are de-energized. The trailer protector valve 23 is in charged or cocked position with the relay valve 30 and trailer brakes in the de-energized condition thereof and subject to normal service applications.

During a normal service application, pressure fluid from the main or tractor reservoir 5 is metered through the application valve 13 to the air cylinders 16 to actuate the tractor brakes, and concurrently flows through the service lines 14, 18 and 26, enters the service port 28 and flows past the open service inlet control valve 102 through the connection chamber 96 and the service line 26a to energize the relay valve 30 and effect actuation of the trailer brakes. The compressive force of the spring 103 together with the force of pressure fluid in the internal chamber 92 acting on the valve 101 of course prevents the opening of this valve. A service application is terminated by releasing the application valve 13 so that pressure fluid controlling the relay valve 30 is exhausted through the application valve, as described. Due to reductions of fluid pressure in the reservoirs 5 and 25 by service applications, the compressor 4 will be cyclically operative to recharge the reservoirs to the preselected maximum pressure. However, the emergency piston 87 and the valves 101 and 102 will remain in cocked position and the check valve 49 will only be open during the charging operation when a pressure drop from the inlet port 22 to the inlet chamber 42 occurs.

The trailer protector valve 23 is operative to automatically set the trailer brakes under emergency conditions, which generally occur in the system externally of the valve 23 and effect a reduction of pressure below a predetermined amount in the emergency line 20 and inlet port 22. For instance, this reduction of pressure can occur due to a break in the emergency line thereby exhausting pressure fluid from the emergency inlet port 22 as well as from the control port of the tractor protector valve 7 and from the tractor reservoir 5. It can also occur due to failure of the service lines, compressor or other means whereby the fluid pressure in the tractor reservoir 5 drops to a value causing the tractor protector valve 7 to close in a conventional manner and exhaust to atmosphere the emergency and service outlet lines 10 and 18 to the trailer protector valve 23.

When the fluid pressure in the emergency inlet port 22 of the trailer protector valve 23 is reduced to a predetermined value with a similar reduction also being effected in the control chamber 39 and passages 73, 74 and 76, the compressive force of the spring 86 overcomes the force of the fluid pressure acting on the area $A_4$ of the control piston 87 thereby moving the piston leftwardly to its uncocked position to close the service inlet control valve 102 and open the emergency inlet control valve 101. This action allows air from trailer reservoir 25 to flow through the emergency line 20a and the inlet, internal and connection chambers 42, 92 and 96 and their connecting passages to the service outlet port and line 29 and 26a to actuate the relay valve 30, as previously described, whereby the reservoir 25 is connected internally through the valve 30 to the trailer brake line 32 and the trailer brakes are applied. In order to de-activate the trailer protector valve 23 from its emergency condition, the predetermined fluid pressure must be re-established in the emergency inlet 22 acting on the piston area $A_4$ so that the piston and the valve parts are moved to the charged or cocked positions by this charging operation.

The plunger 60 of the trailer release control portion 38 is manually movable between first and second positions which may be referred to as an "in" or "trailer brake release" position and an "out" or "trailer brake parking" position, the latter being the normal operative position of the plunger in which the foregoing charging, service and emergency operations occur. When the plunger 60 is in the "trailer brake release" position, the guide portion 61 and large piston member 64 remains sealably engaged in the bushing bore 59 and main bore 53, respectively, and the small piston member 66 sealably engages the counterbore 47 to interrupt pressure fluid communication between the emergency inlet port 22 and the emergency outlet port 24. In this "in" position, the piston extension 69 also displaces the check valve 49 from its seat 51 to establish fluid communication between the reservoir 25 through the inlet chamber 42 and passages 73, 74 and 76 to act on the area $A_4$ and to charge the emergency piston 87 to its cocked position.

With the plunger 60 in the "out" position and the tractor-trailer system 1 in normal service operation, when the operator desires to park the trailer so that the tractor can be independently operated, the tractor and trailer air systems 2 and 3 are separated by uncoupling the gladhand couplers 11, 21 and 19, 27. Immediate emergency actuation of the trailer protector valve 23 is effected by exhausting fluid pressure through the passages 76, 74 and 73 and from the tractor connection chamber 39 and the inlet port 22 and emergency line 20 to atmosphere. A pressure drop is thus established across the check valve 49 to seat this check valve and maintain the integrity of the trailer reservoir 25 and, since the pressure acting on area $A_4$ of the emergency piston 87 is exhausted, the compressive force of the spring 86 moves the emergency piston to the uncocked position to close the service inlet valve 102 and open the emergency valve 101 to connect the trailer reservoir 25 with the service outlet port 29 to energize the relay valve 30. The relay valve 30 thus connects the trailer reservoir 25 to the brake chambers 33 to energize the trailer brakes so that the trailer is parked and the tractor can be moved independently of the trailer.

When the valve 23 is in the applied emergency position and the emergency piston 87 is uncocked and it is desired to move the trailer from one parking place to another without reconnecting the trailer air system 3 with the tractor air system 2, the plunger 60 of the trailer protector valve 23 is manually moved from the "out" position to the "in" position so that the O-ring 68 of the small piston portion 67 is sealably engaged in the counterbore 47 to isolate the tractor connection chamber 39 and unseat the check valve 49 from its seat 51, as previously described. Therefore, fluid pressure of the trailer reservoir 25 flows past the check valve 49 and through the passages 73, 74 and 76 and acts on the area $A_4$ of the emergency piston 87. Inasmuch as the passage 74 intersects the radial shoulder 70 of the plunger 60 and communicates with the passage 76 at the end of the bushing 56, the fluid pressure also acts on the area $A_1$ of the large piston member 64 of the plunger and, since the area $A_1$ is greater than the area $A_3$ formed at the radial shoulder between the small piston member 66 and the piston extension 69 and the pressure on the area $A_2$ is atmospheric, a force is created to maintain the plunger 60 in the "in" position. When the pressure acting on the area $A_4$ of the emergency piston 87 creates a force great enough to overcome the compressive force of the spring 86, the emergency piston 87 is moved rightwardly to its charged or cocked position thereby closing the emergency valve 101 and opening the service valve 102 to connect the relay valve 30 through service line 26a, the connection chamber 97, service inlet port 28 and service line 26 to exhaust the pressure from the relay valve 30 to atmosphere through the open coupler 27. The relay valve 30 exhausts the brake chamber 33 to atmosphere and isolates the reservoir 25 therefrom to de-energize the trailer brakes so that the trailer can be moved from one parking position to another. The plunger 60 in its "in" position preserves the integrity of the trailer reservoir 25 by isolating the chamber 39 from the inlet chamber 42 and by moving the piston 87 to cocked position to close the emergency valve 101 to prevent pressure fluid communication through the trailer protector valve 23 to any atmospheric connection.

If it is desired to repark the trailer, the plunger 60 of the valve 23 is manually moved from the "in" position to the "out" position to effect emergency operation of the trailer protector valve 23 and actuate the trailer brakes.

With the plunger 60 of the trailer protector valve 23 in the "in" position so as to de-energize the trailer brakes or override the emergency function of the valve, assume that the tractor and trailer air systems 2 and 3 are reconnected by coupling the gladhands 11, 21 and 19, 27 to provide for normal operation. The fluid pressure in the trailer reservoir 25 is acting on the plunger area $A_3$ and through the plunger passages 73 and 74 to act on area $A_1$ creating opposing forces $F_3$ and $F_1$, respectively. Since the area $A_1$ is greater than the area $A_3$, the force $F_1$ is greater than the force $F_3$ thereby holding the plunger 60 in the "in" position. The fluid pressure in the tractor reservoir 5 created by the compressor 4 and discharged through the trailer emergency line 20 into the tractor connection chamber 39 acts on the relatively large effective area $A_2$ of the plunger piston 64 thereby creating a force $F_2$ in opposition to the force $F_1$ and which is additive to the force $F_3$. When the differential of intensities of the additive forces $F_2$ plus $F_3$ overcomes the force $F_1$, the plunger 60 is automatically moved from the "in" to "out" position so that the sealing member 68 of the small piston 66 is disengaged from the counterbore 47 and the piston extension 69 is spaced from the check valve 49. Accordingly, pressure fluid again flows from the tractor system 2 into the trailer protector valve 23 and is effective to recharge the trailer reservoir 25 to compensate for any drop in fluid pressure by reason of the emergency or reparking operations and also to act on the area $A_4$ to move the emergency piston 87 to its cocked position for normal operation. It will be noted that the area $A_2$ is larger than the area $A_3$ so that fluid pressure from the tractor system 2 will create a force $F_2$ which is great enough alone to move the plunger 60 to its "out" position and normally maintain the plunger in this position.

Referring now to FIGURE 4 wherein a modified embodiment of the trailer protector valve 123 is shown, all parts of the modified valve having identical parts in the valve 23 shown in FIGURE 2 are provided with the same reference numerals and the modification resides in the emergency control portion 44 of the valve 123. More specifically, a modified emergency piston 187 has an extension member 191 with a reduced diameter relative to the diameter of the large piston member 89. The extension member 191 is slidably mounted in the bore 204 of a plug insert 205 closing the end of the counterbore 82. The interior chamber of bore 204 is vented through port 205a. Fluid pressure in the internal chamber 192 will act on the opposed effective areas of the large end 89 and the extension member 191 creating a leftward force on the emergency control piston 187 due to the differential in area $A_5$ of the former, and thus permit the elimination of the control piston spring 86 shown in FIGURE 2. The area $A_4$ of the shoulder 90 of the piston 187 is larger than the differential area $A_5$ of the large piston end 89 against which pressure fluid is effective so that the emergency piston 187 is moved to a charged position in response to a differential in forces acting in opposed directions on the effective areas thereof.

The operation of the trailer protector valve 123 is similar to the operation set out hereinbefore except under emergency conditions. A predetermined reduction in fluid pressure acting on the area $A_4$ of the piston 187 allows the trailer reservoir pressure acting in the internal chamber 192 on the effective differential areas of the large piston member 89 and the extension member 191 to move the piston leftwardly to close the service inlet valve 102 and open the emergency valve 101 for the emergency fluid communication of the trailer reservoir 25 with the service outlet port 29, as previously described. In regard to the parking function of the trailer protector valve 123, when the couplers 11, 21 and 19, 27 are separated the emergency line pressure acting on the area $A_4$ is exhausted and the pressure of the trailer reservoir 25 acting on the differential area $A_5$ creates a force $F_5$ to move the emergency piston 187 to its uncocked position to effect emergency brake actuation.

Referring now to FIGURE 3, it will be seen that a modified trailer system 113 is illustrated to represent the applicability of the trailer protector valve 23, 123 in an air/hydraulic trailer braking arrangement. As shown in FIGURE 3, the trailer emergency and service lines 20 and 26 are connected between the valve and the tractor system and the emergency line 20a is connected from the emergency outlet port 24 of the valve to the trailer reservoir 25, as in the FIGURE 1 embodiment. However, the service line 26a is connected from the service outlet port 29 of the trailer protector valve and to the air chamber 206 of a slave power cluster 207 having a reciprocable piston 208 operatively connected to control a master cylinder 209. The master cylinder 209 is connected to the trailer brake assembly 210 by a conduit 211. It will be readily apparent that the trailer protector valve functions in the modified system 113 as described in connection with the trailer system 3, except that the need for a relay valve 30 or the like is obviated and the valve 23, 123 directly controls the operation of the power cluster 207.

From the foregoing it will be readily apparent that trailer protector valve 23, 123 meets the objects and advantages of the invention.

The invention is intended to cover all changes and modifications of the embodiment herein disclosed that will be readily apparent to those skilled in the art, and the invention is only to be limited by the claims which follow.

The embodiments of the invention in which an exclusive property or privilege is claimed are defined as follows:

1. A trailer protector valve having emergency inlet and reservoir ports adapted to be connected to main and auxiliary pressure fluid sources, service inlet and outlet ports adapted to be connected to application and brake actuating means, emergency control means movable between first and second positions for controlling pressure fluid communication between said service outlet port and said service inlet and reservoir ports in response to increase and reduction of fluid pressure above and below a predetermined magnitude acting on a pressure responsive area of said emergency control means, and release control means interposed between said emergency inlet and reservoir ports and including a stepped first chamber connected to said emergency inlet port, plunger means slidable in said first chamber and including a large diameter piston member, an intermediate diameter member on one side of said large piston member forming a small area therebetween in communication with said pressure responsive area of said emergency control means, and a small diameter piston member on the other side of said large piston member forming a large area in communication with said first chamber, manual means extending from said intermediate member externally of said trailer protector valve, a second chamber adjacent to said first chamber and connected therewith by first passage means co-axially aligned with said plunger means, said second chamber being connected to said reservoir port, extension means on said small piston member and extending into said first passage means, second passage means in said plunger means extending between said extension means and said small area, said plunger means being movable between a first position connecting said emergency inlet port through said second passage means to communicate with said predetermined area of said valve means and a second position connecting said reservoir port through said second chamber and passage means to communicate with said pressure responsive area and sealing off said emergency inlet port and first chamber therefrom.

2. A trailer protector valve for a trailer air brake system comprising a casing having a stepped first chamber, plunger means slidable in said first chamber and including a large diameter piston member, an intermediate diameter member on one side of said large piston member forming a small area therebetween and a small diameter piston member on the other side of said large piston member forming a large area therebetween, manual means extending from said intermediate member externally of said casing, an emergency inlet port to said first chamber in communication with said large area, a second chamber adjacent to said first chamber and connected therewith by first passage means co-axially aligned with said plunger means, extension means on said small piston member and extending into said first passage means, second passage means in said plunger means extending between said extension means and said small area, a reservoir port to said second chamber, service inlet and outlet ports in said casing, valve means for controlling communication between said service ports and between said reservoir and service outlet ports, and third passage means between said small area of said plunger means and a pressure responsive area of said valve means, said plunger means being movable between a first position connecting said emergency inlet port through said second and third passage means to said predetermined area of said valve means and a second position connecting said reservoir port through said second chamber and passage means to said predetermined area and sealing off said emergency inlet port.

3. A trailer protector valve for a trailer air brake system and being connected in the emergency line between a tractor air system and a trailer reservoir and also being connected in the service line between an application valve of the tractor system and the control port of the trailer relay valve means, said trailer protector valve comprising adjacent first and second chambers having check valve means normally permitting only unidirectional pressure fluid flow from said tractor air system to said trailer reservoir, a third chamber housing slidable piston means, a fourth chamber adjacent to said third chamber and communicating with said trailer relay valve means, valve means carried by said piston means for controlling pressure fluid communication between said third and fourth chambers and between said application valve and fourth chamber, and passage means connecting said first and second chambers to said third chamber in communication with opposed areas of said piston means so that fluid pressure of predetermined magnitude in said first chamber and passage means acting on one area of said piston means creates a first force urging said piston means to a charged position to move said valve means to interrupt communication between said third and fourth chambers and to connect said application valve to said trailer relay valve means through said fourth chamber, means acting on said piston means in opposition to said first force to seal off said application valve from said fourth chamber and establish communication of said fourth chamber with said trailer reservoir through said second and third chambers when said fluid pressure in said first chamber is below the predetermined magnitude to thereby effect emergency actuation of the trailer relay valve means, and plunger means in said first chamber adapted to seal off said first chamber and to open said check valve means to connect said trailer reservoir through said second chamber to said passage means and one area of said piston means to thereby establish fluid pressure on said one area exceeding said predetermined magnitude to move said piston means to its charged position and release the trailer relay valve means.

4. A trailer protector valve for a trailer air brake system and being connected in the emergency line between a tractor air system and a trailer reservoir and also being connected in the service line between an application valve of the tractor system and the control port of the trailer relay valve means, said trailer protector valve comprising adjacent first and second chambers having check valve means normally permitting only unidirectional pressure fluid flow from said tractor air system to said trailer reservoir, a third chamber housing slidable piston means, a fourth chamber adjacent to said third chamber and communicating with said trailer relay valve means, valve means carried by said piston means for controlling pressure fluid communication between said third and fourth chambers and between said application valve and fourth chamber, and passage means connecting said first and second chambers to said third chamber in communication with opposed areas of said piston means so that fluid pressure of predetermined magnitude in said first chamber and passage means acting on one area of said piston means creates a first force urging said piston means to a charged position to move said valve means to interrupt communication between said third and fourth chambers and to connect said application valve to said trailer relay valve means through said fourth chamber, spring means of predetermined force acting on said piston means in opposition to said first force to seal off said application valve from said fourth chamber and establish communication of said fourth chamber with said trailer reservoir through said second and third chambers when said fluid pressure in said first chamber is below the predetermined magnitude to thereby effect emergency actuation of the trailer relay valve means, and plunger means in said first chamber adapted to seal off said first chamber from said second chamber and passage means to said one area and to open said check valve means to connect said trailer reservoir to said passage means to thereby establish a fluid pressure on said one area exceeding said predetermined magnitude and overcome said spring means to move said piston means to its charged position and release the trailer relay valve means.

5. A trailer protector valve for a trailer air brake system and being connected in the emergency line between a tractor air system and a trailer reservoir and also being connected in the service line between an application valve of the tractor system and the control port of the trailer relay valve means, said trailer protector valve comprising adjacent first and second chambers having check valve means normally permitting only unidirectional pressure fluid flow from said tractor air system to said trailer reservoir, a third chamber housing slidable piston means, a fourth chamber adjacent to said third chamber and communicating with said trailer relay valve means, valve means carried by said piston means for controlling pressure fluid communication between said third and fourth chambers and between said application valve and fourth chamber, and passage means connecting said first and second chambers to said third chamber in communication with opposed differential areas of said piston means so that fluid pressure of predetermined magnitude in said first chamber and passage means acting on one area of said piston means creates a first force urging said piston means to a charged position to move said valve means to interrupt communication between said third and fourth chambers and to connect said application valve to said trailer relay valve means through said fourth chamber, the fluid pressure in said second chamber means acting on the other area of said piston means in opposition to said first force moving said piston means to seal off said application valve from said fourth chamber and establish communication of said fourth chamber with said trailer reservoir through said second and third chambers to thereby effect emergency actuation of the trailer relay valve means when said fluid pressure in said first chamber is below the predetermined magnitude, and plunger means in said first chamber adapted to seal off said first chamber from said second chamber and passage means to said one area and to open said check valve means to connect said trailer reservoir to said passage means to thereby establish a fluid pressure on said one area exceeding said predetermined magnitude to move said piston means to its charged position and release the trailer relay valve means.

References Cited by the Examiner

UNITED STATES PATENTS

| 2,168,748 | 8/1936 | Leukhardt | 303—63 |
| 3,085,833 | 4/1963 | Schultz | 303—29 |
| 3,212,825 | 10/1965 | Bueler | 303—29 |

FOREIGN PATENTS

| 331,787 | 11/1935 | Italy. |
| 448,933 | 5/1949 | Italy. |

EUGENE G. BOTZ, *Primary Examiner.*